United States Patent [19]

Van Brederode et al.

[11] 3,966,845

[45] June 29, 1976

[54] ACRYLIC ACID GRAFTED POLYOLEFINS AS NUCLEATING AGENTS FOR UNGRAFTED POLYOLEFINS

[75] Inventors: Robert A. Van Brederode; Robert A. Steinkamp, both of Baytown, Tex.

[73] Assignee: Exxon Research & Engineering Co., Linden, N.J.

[22] Filed: May 22, 1974

[21] Appl. No.: 472,169

Related U.S. Application Data

[63] Continuation-in-part of Ser. No. 240,468, April 3, 1972, abandoned.

[52] U.S. Cl. ..................... 260/876 R; 260/897 B; 264/331; 260/DIG. 35
[51] Int. Cl.² ........................................ C08L 23/08
[58] Field of Search.......... 260/876 R, 897, DIG. 35

[56] References Cited
UNITED STATES PATENTS 3,207,739   9/1965   Wales .............................. 260/93.7

FOREIGN PATENTS OR APPLICATIONS 44-5087   1969   Japan ............................ 260/876 R Primary Examiner—Carman J. Seccuro
Attorney, Agent, or Firm—David A. Roth

[57] ABSTRACT

Polyolefins which have been modified by being graft polymerized with from about 1 to 15 weight percent of an acrylic acid or derivative thereof are outstanding nucleating agents when added to unmodified polyolefins in concentrations of about 0.1 to 15 weight percent.

10 Claims, No Drawings

3,966,845

ACRYLIC ACID GRAFTED POLYOLEFINS AS NUCLEATING AGENTS FOR UNGRAFTED POLYOLEFINS

RELATED APPLICATIONS

This is a continuation-in-part of Ser. No. 240,468, now abandoned entitled Grafted Polyolefins as Nucleating Agents for Ungrafted Polyolefins, which application is hereby incorporated by reference in its entirety.

BACKGROUND OF THE INVENTION

Stereo-regular crystalline polyolefins made from Ziegler type catalysts; i.e., transition metal catalysts, particularly polypropylene which is substantially isotactic, have enjoyed phenominal growth. They are used to produce shaped articles varying from fibers to toys.

Crystalline polymers in their usual form, from the reactor have many outstandingly good properties and some undesirable ones. For example, the outstanding desirable properties of crystalline polypropylene are high tensile strength and substantial hardness. A disadvantage of the highly crystalline polypropylene is a lack of transparency or clarity, which shows up as opacity or translucency in fairly thick articles and as haze in thin films.

Highly crystalline polypropylene has another congenital disadvantage, which is its relatively low impact resistance, particularly at low temperatures.

It is known within the art that the problems with opacity and haze can be alleviated to a large extent with the addition of certain materials to the polymer, which are termed nucleating agents. These apparently modify the crystallization process, particularly in altering the size of the spherulites formed upon crystallization.

Generally speaking, the materials known to the art for nucleation purposes are either very small, finely divided solid inorganic materials, such as silica, or they are organic fatty carboxylic or polycarboxylic acids and derivatives thereof. Relevant prior art patents include U.S. Pat. Nos. 2,991,264; 3,517,086, 3,207,735–739.

U.S. Pat. No. 3,483,276 shows maleic anhydride grafted polypropylene dispersed in homopolypropylene, but there is no teaching that this nucleates. And indeed, data presented herein shows that maleic anhydride grafts do not nucleate.

SUMMARY OF THE INVENTION

A modified polymer (particularly a polyolefin) having grafted acrylic acid (or derivatives thereof) side chains thereon is an outstanding nucleating agent when added to unmodified polyolefins in relatively low concentrations.

DETAILED DESCRIPTION OF THE INVENTION WITH PREFERRED EMBODIMENTS

It has been discovered and forms the essence of this invention that acrylic acid grafted olefin polymers when added to other olefin polymers in relatively small proportions perform as nucleating agents. The polymers containing such nucleating agents require substantially shorter time periods to achieve maximum crystallization rates under isothermal conditions. They crystallize at higher temperatures when cooled from the melt and they produce smaller spherulites than comparable non-nucleated polypropylene polymers.

Other physical properties of olefin polymers which are improved with this type of nucleation agent are the secant flexural modulus (ASTM D790) and tensile strength (ASTM D635). Furthermore, there is little or no change in Izod Impact Energy and the transparency of the polymer is considerably increased.

Moreover, the polymer compositions deriving from the combination of nucleating agents of the present invention plus unmodified polymer in addition show substantially less warpage from molding than do polymers not containing the nucleating agents of the invention.

The nucleating agents of this invention offer several important advantages over those agents known to the prior art. One of the most significant of these lies in the area of mixing. It is very difficult to mix finely divided materials such as silica or organic acids with the relatively high molecular weight polymers that are to be nucleated. It is desirable (and it has been accomplished by the technique of the present invention) that the nucleating agents be essentially similar in physical properties to the materials to be molded and therefore can be blended in just as any other compatible polymer with the material to be molded.

Furthermore, the other class of nucleating agents of the art, which are primarily based on organic acids, normally are also difficult to handle and they present problems in the mold. Thus, these materials are very often slightly volatile to extremely volatile. Under the high temperatures encountered in molds they tend to plate-out on the molds and cause deposits and other undesirable contamination in very expensive molds. In extremely sharp contrast, the nucleating agents of the present invention do not suffer from any of these disadvantages.

The additives of the present invention are also highly advantageous in that relatively small quantities can be used and therefore the material imparts a considerable economic benefit to the total blend.

It has been further noted that the spherulite dimensions in the crystallized articles produced from the compositions of the invention are substantially smaller than they would have been in an article produced in an identical manner from the same polymer without using a nucleating agent.

It is also noted that the transparency of films or even thicker shaped articles produced from compositions prepared according to this invention are substantially improved as compared to articles that have not been nucleated.

Another advantage of the invention is that in general better mixing or homogenization of the polymer melt blend with this nucleating agent is obtained. Thus, the nucleating agent of the invention disperses more easily and more uniformly than conventional nucleating agents. Consequently, injection molding of the polymer can be carried out at lower processing temperatures than would otherwise be possible.

Another advantage is that the mixtures according to the invention solidify at an appreciably higher temperature than those of identical polymers not containing the nucleating agent, hence processing can be carried out in a considerably shorter period of time, thus gaining much better utility on expensive capital investment processing equipment.

As indicated above, one of the mechanical disadvantages of crystalline polyolefins such as polypropylene in addition to the transparency problem is the lack of impact strength, particularly at the low temperatures. Manufacturers have adjusted to this deficiency with many techniques, probably the best known is the use of flexiblizing polymers such as rubbery substances to be incorporated in the crystalline polymer.

These rubbery substances include polyisobutylene, polybutadiene, polyethylene — propylene elastomers and the like. Furthermore, the elastomeric components and plastic components making a binary mixture can be also modified with various polyethylenes and ethylene copolymers which are flexible and interact with the other two polymers in an unknown manner to produce ternary mixtures of good impact strength.

It is a feature of the present invention that the nucleating agents are equally effective in nucleating and to some extent even more effective with binary and ternary impact mixtures of crystalline, polyolefins particularly polypropylene.

Moreover, the nucleating agent need only be added in very low quantities. Futhermore, some improvement in transparency of even binary or ternary blends can be obtained with the use of the nucleating agent of the invention. One of the advantages of the invention as alluded to above is that mixing can be accomplished directly in the extruder, avoiding the intensive mixing; e.g., hot rolls and Banbury mixer kneading which would be necessary with conventional nucleating agents of the art, such as sodium benzoate.

The amount of grafted acrylic acid component which can be introduced into a base polymer to be used for a nucleating agent can range from 1 to 20 weight percent depending on the grafting system used. In extruder grafting in which the grafting reaction takes place in a very, very short period of time and in a relatively limited space while the polymer is passing through the extruder, generally it is convenient to graft only about 1 to 10 weight percent of graft polymer to the backbone polymer without generating excessive amounts of homopolymer; e.g., homoacrylic acid polymer. Quantities of from 1 to 20 weight percent of homopolymer can be tolerated without any noticeable adverse effects. However, quantities of homopolymer above that limit are not preferred.

Therefore, for the purposes of this invention the additive grafted polymer will generally contain from about 0.1 to 15, preferably 2 to 8 and most preferably 4 to 10 weight percent of grafted component.

This graft polymer nucleating agent will generally be used in amounts of from 0.1 to 15 preferably 0.5 to 3 and most preferably 0.5 to 2 weight percent blended with other polymers based on a total weight percent of the resulting polymer blend.

Thus the amount of grafted component in the resulting blend will be very small. This is illustrated as follows:

| Wt. % of Grafted Component in Grafted Polymer | Wt. % of Grafted Polymer in Final Blend | Wt. % of Grafted Component in Final Blend |
| --- | --- | --- |
| 0.1 to 15 | 0.1 to 15 | .0001 to 2.25 |
| 2 to 8 | 0.5 to 3 | .01 to 0.24 |
| 4 to 10 | 0.5 to 2 | .02 to 0.2 |
| | | 0.06 to 1 is a preferred range |

One can easily calculate suitable amounts of nucleating agent to be used based on the above considerations.

Outstanding results and preferred embodiments of this invention are those in which the acrylic acid graft copolymer meets some highly specific criteria.

CHARACTERISTICS OF THE PREFERRED NUCLEATING AGENT POLYMER

The most highly preferred acrylic acid graft polymer to be used in the blends of the invention can be characterized in several respects. These are:
1. A melt index or MFR of from 1 to 1,000 preferably 10 to 250, most preferably 10 to 100 and most preferably at least 25%, better 50%, and best 200% higher than the MFR or melt index of a starting polymer having a MI or MFR of from no-flow to 50 as measured under conditions of A.S.T.M. Test No. D-1238-65T.
2. A graft comonomer content of from 0.1 to 15, preferably 2 to 8 and most preferably 4 to 10, based on the total weight of the graft copolymer.
3. A die swell at least 0.5 and preferably 1.0 of a unit less than that of the base polymer.

The present invention utilizes a grafted polymer of a $C_2$ to $C_8$-$\alpha$-olefin or its copolymers with acrylic acid, preferably prepared by the grafting process of Ser. No. 240,468. The polymers of $C_2$ to $C_8$-$\alpha$-olefins are commonly referred to as polyolefins and for the purpose of this invention are to include copolymers of the $C_2$ to $C_8$-$\alpha$-olefins with each other and with other monomers as well as the homopolymers.

Polymers containing diolefins such as butadiene and isoprene are also suitable. The polyolefins are produced utilizing in most instances a transition metal (Ziegler) catalyst, but can also be Phillips catalysts and high pressure technology. The processes for making the $C_2$ to $C_8$ polyolefins are well known and form no part of the present invention.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono or diolefins) or vinly monomers such as ethylene-propylene copolymer or with one or more additional monomers; i.e., EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene; i.e. polypropylene and polyethylene. The starting polymer used as a base material in the present invention will preferably have a melt index (MI) of 1 to 40, preferably 5 to 40, and most preferably 15 to 40, or melt flow rate (MFR) between about 0.1 to 50 and preferably 0.1 to 5.0, most preferably 0.5 to 2. These melt flow rates correspond approximately to viscosity average molecular weights of about 500,000 to 2,000,000.

In the preparation of normally solid polymers of 1-olefins, certain rheological properties are frequently utilized for control purposes. One of these rheological properties more usually employed is melt index or melt flow rate which characterizes the processability of the polymers and is also an approximate indication of polymer molecular weight.

The melt index of polyethylene is measured normally according to the A.S.T.M. Test D-1238-65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing in combination with its plunger 2,160 grams.

The melt flow rate (MFR) of polypropylene is determined by the same procedure except at a temperature of 230° C. according to A.S.T.M. D-1238-65T.

The apparatus utilized for determining melt index is defined in A.S.T.M. manual as a "dead-weight piston plastometer."

Generally speaking, polypropylene from a reactor will have MFR below 1, while polyethylenes from a reactor can have a MI of about 15 to 30.

The grafting reaction is preferably initiated by a free-radical initiator which is preferably an organic peroxygen compound. Especially preferred peroxides are t-butyl benzoate, dicumyl peroxide, 2,5-dimethyl-,5-di-tert-butylperoxy-3-hexyne (Lupersol 130), $\alpha',\alpha'$-bis(-tert-butylperoxy) diisopropyl benzene (VulCup R), or any free radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference, for a more complete list of such compounds.

A particularly preferred polymer made by a process described in said S.N. 240,468 involves grafting the polyolefin in an extruder reaction.

DIE SWELL

Some high molecular weight polymers such as polyolefins when forced through a capillary die of a relatively short length produce an extrudate of a larger diameter than the diamter of the capillary.

This property of polymers has been characterized as die swell, which is expressed numerically as the ratio of the diameter of the extrudate to the diameter of the capillary (by some the ratio to the first power and by others to the second power). The term "die swell" as used herein is defined as follows:

$$\text{die swell} = (D_e/D_o)^2$$

where:
$d_e$ is the extrudate diameter
$d_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of ⅜ inch I.D. (inside diameter) was used wherein the barrel was heated to a temperature controlled to ± 2° F. of the recorded temperature and the polymer was forced through a capillary having a 0.03018 inch I.D. and which was 1.0006 inch long. The capillary had a 90° entry angle.

The measurements were made by forcing the polymer through the capillary by a plunger operating at a constant speed or a constant shear rate ($\dot{\gamma}$) ranging from 13.5 reciprocal seconds to 338.3 reciprocal seconds ($sec^{-1}$). The polymer was forced through the capillary into ambient air at room temperature (70° – 80° F.).

The measurement of die swell is frequently used as a gross measure of molecular weight distribution.

It has been found that maleic anhydride grafts of polypropylene are not effective nucleaters and, therefore, would not act as nucleating agents when used as additives.

One possibility for this phenomena, which is quite reasonable, appears to be that maleic anhydride grafts on a polymeric backbone by forming *short* monomeric length maleic anhydride grafts. In other words, maleic anhydride will not homopolymerize with itself. And therefore, the grafted polymer has *many* monomeric length grafts along its backbone. In sharp contrast, the acrylic acid homopolymerizes with itself exceedingly readily. And, therefore, the grafts formed from acrylic acid are rather long acrylic acid homopolymer side chains which are linked to the polypropylene polyolefin backbone.

The startling difference between lack of nucleation abilities of a maleic anhydride graft and the outstanding ones of an acrylic acid graft can be postulated as being the effect of having relatively long but few acrylic acid *glassy blocks* scattered throughout the polypropylene matrix which form convenient sites upon which crystallites can form. This is especially likely since the acrylic acid homopolymer and polypropylene have different glass transition points.

At any rate, there is demonstrated herein quite remarkable differences in the nucleating effect of acrylic acid grafts and maleic anhydride grafts. Maleic anhydride grafts, if one analyzes the data, seem to have hardly any nucleation effect.

When such maleic grafts are used as additives, it can be readily appreciated that they will not nucleate a homopolypropylene at all.

The invention will be further illustrated by the following examples.

EXAMPLE 1

A series of polypropylene polymer compositions were prepared from various lots of commercial highly crystalline isotactic polypropylene using a commercial nucleating agent; i.e., sodium benzoate and a polymer comprising acrylic acid grafted polypropylene having a melt flow rate of about 50 and containing about 6 weight percent of grafted acrylic acid produced by the extruder grafting process described above.

Generally the acrylic acid grafted polymer was tested at weight percents of 1 to 10 and evaluated in various ways. The results are summarized below in Table I.

TABLE I

EVIDENCE FOR THE NUCLEATION OF POLYPROPYLENE POLYMERS BY THE INCORPORATION OF ACRYLIC ACID GRAFTED POLYPROPYLENE (PNA)

| Compositions | Nucleating Agent | Time to Maximum Crystallization Rate*, Min. | Temp. of Maximum Crystallization** °C | Sperulite Size***, $\mu$ |
|---|---|---|---|---|
| 1. Enjay D-529 | 200 ppm Sodium Benzoate | 0.85 | 120 | <2 |
| 2. Enjay CD-490 | a) None | >60 | 108 | ~40 |
|  | b) 10 Wt. % PNA | 1.35 | 123 | <2 |
|  | c) 1 Wt. % PNA | 2.2 | 120 | <2 |

TABLE I-continued
EVIDENCE FOR THE NUCLEATION OF POLYPROPYLENE POLYMERS BY THE INCORPORATION OF ACRYLIC ACID GRAFTED POLYPROPYLENE (PNA)

| Compositions | Nucleating Agent | Time to Maximum Crystallization Rate*, Min. | Temp. of Maximum Crystallization** °C | Spherulite Size***, μ |
|---|---|---|---|---|
| 3. Enjay CD-460 | a) None | 17 | 110 | ~10 |
|  | b) 10 Wt. % PNA | 1.15 | 124 | <2 |
|  | c) 1 Wt. % PNA | 1.6 | 122 | <2 |
| 4. Enjay CD-392 | a) None | >60 | 109 | ~10 |
|  | b) 10 Wt. % PNA | 1.35 | 122 | <2 |
|  | c) 1 Wt. % PNA | 2.1 | 119 | <2 |
| 5. Enjay E-115 (essentially similar to D-529) | a) None | 30 | 110 | ~20 |
|  | b) 10 Wt. % PNA | 1.15 | 125 | <2 |
|  | c) 1 Wt. % PNA | 1.75 | 122 | <2 |

*Polymer is melted at 200° C, held at this temperature for 5 minutes and quickly cooled to 130° C in a Perkin-Elmer Differential Scanning Calorimeter. The time required to achieve the maximum crystallization rate is measured from the time the sample reaches 130° C to the time where there is maximum imbalance between the DSC platens.
**Polymer is melted at 200°, held at this temperature for 5 minutes and cooled at 10° C per minute using a Perkin-Elmer Differential Scanning Calorimeter. The temperature of maximum crystallization is that temperature where there is maximum imbalance between the DSC platens.
***A one mil polymer film is pressed of each sample. All samples were put in a 200° C oven for 1 hour and then allowed to cool slowly to ambient temperature.
Present grades are designated as Exxon rather than Enjay

COMMENTS

As can be seen from the above Table I, the nucleating agents of the invention reduce the spherulite size to that comparable to those obtained with a commercial nucleating agent. Furthermore, the temperature of maximum crystallizations of the compositions containing a nucleating agent of the invention was at least comparable to those temperatures obtained with a commercial nucleating agent and in several instances were higher, the highest temperature being about 125° C. Furthermore, it can be seen that the time to realize maximum crystallization rates decreased dramatically over that of the polymer containing no nucleating agent.

It is also to be noted that while considerable improvements are to be noted at the 10 weight percent usage of the grafted acrylic acid polymer, almost comparable results are obtained with only 1 weight percent of grafted polymer. That indicates one of the exemplary advantages of the invention in that very small and therefore economic quantities of the nucleating agent of the invention are required. Some of the polymers modified as indicated above were further evaluated in flexural modulus and tensile strength and Izod Impact Energy tests, the results are shown below in Table II.

In a direct comparison between a sodium benzoate nucleated polypropylene and a polypropylene nucleated according to the invention, the two are comparable in spherulite size, PNA is marginally superior in temperature of crystallization properties and sodium benzoate is marginally superior in maximum crystallization times. All percentages used herein are weight percents unless otherwise indicated.

TABLE II
PHYSICAL PROPERTIES OF ACRYLIC ACID MODIFIED POLYPROPYLENE (PNA) NUCLEATED POLYPROPYLENE POLYMERS

| Sample | Nucleating Agent | Secant Flexural Modulus, psi | Tensile Strength at Yield, psi | Izod Impact Energy Ft Lbs/In | | | |
|---|---|---|---|---|---|---|---|
|  |  |  |  | Notched 73°F | Unnotched 73°F | 0°F | 20°F |
| 1. Enjay, CD-490 | a) None | 132,000 | 4484 | 0.62 | 30.0 | 4.0 | 3.8 |
|  | b) 10 Wt. % PNA | 173,000 | 4838 | 1.4 | 27.1 | 3.6 | 3.5 |
|  | c) 1 Wt. % PNA | 169,000 | 4770 | 0.83 | 28.2 | 3.8 | 3.6 |
| 2. Enjay, CD-460 | a) None | 179,000 | 5297 | 0.55 | 15.1 | 3.4 | 3.4 |
|  | b) 10 Wt. % PNA | 212,000 | 5422 | 0.98 | 19.6 | 3.8 | 3.4 |
|  | c) 1 Wt. % PNA | 212,000 | 5446 | 0.57 | 22.6 | 4.1 | 3.8 |
| 3. Enjay, CD-392 | a) None | 149,000 | 4262 | 0.61 | 26.4 | 3.6 | 3.6 |
|  | b) 10 Wt. % PNA | 165,000 | 4673 | 1.2 | 22.6 | 3.5 | 3.4 |
|  | c) 1 Wt. % PNA | 156,000 | 4640 | 0.8 | 27.5 | 3.4 | 3.4 |
| 4. Enjay, E-115 | a) None | 217,000 | 5202 | 0.61 | 25.4 | 4.4 | 4.1 |
|  | b) 10 Wt. % PNA | 214,000 | 5421 | 0.97 | 27.2 | 4.6 | 4.2 |
|  | c) 1 Wt. % PNA | 223,000 | 5433 | 0.67 | 29.8 | 5.1 | 4.4 |

Present grades are designated as Exxon rather than Enjay

COMMENTS

As can be seen above, the use of the nucleating agents of the invention improve the secant flexural modulus and the tensile strengths. As to Izod Impact strengths, they remain essentially the same at very low temperatures which is the important area for evaluating impact strengths.

EXAMPLE 2

That in order to demonstrate that the claimed acrylic acid grafted polyolefin is an excellent nucleating material as compared to a maleic anhydride grafted polyolefin, comparative data was obtained on commercially available maleic anhydride grafted polypropylenes which are obtainable from Hercules under the trademark of HERCOPRIME. These were compared to a polypropylene which was grafted with about 6 wt. percent of acrylic acid.

The data was obtained in accordance with the procedure described in Table I, Page 15. This consisted essentially of melting the polymer at 200° C., holding it for 5 minutes and quickly cooling it to 130° C. in a Perkins-Elmer Differential Scanning Calorimeter. The time required to achieve the maximum crystallization rate was measured from the time the sample reaches 130° C. to the time when there is maximum imbalance between the Differential Scanning Calorimeter platens. The data is summarized in Table III as follows:

TABLE III

| Resin | Isothermal Crystallization Half Time at 130° C., Min. |
| --- | --- |
| XPA-4, Lot D-2* | 0.85 |
| Hercoprime A-35 Lot 29034 | 6.8 |
| Hercoprime G-35 Lot 29210 | 21.2 |

*Commercial Acrylic Acid Grafted Polypropylene (3 weight percent graft)

As can be seen from the above data, the crystallization half times for the Hercoprime products are exceedingly high as compared to that for the acrylic acid grafted polypropylene. The relatively long isothermal crystallization times obtained on all maleic anhydride grafted Hercules products are quite similar to data obtained on polypropylene homopolymer samples and indicates strongly that there is very little, if any, nucleation resulting from these commercially available maleic anhydride grafts.

Since the polymer which is to be used as an additive to unmodified homopolypropylene is not itself nucleated, it will not cause nucleation when added to an unmodified homopolypropylene and therefore cannot be used as an additive as is the essence of the present invention.

Thus, it is clear that acrylic acid grafted polypropylene is well nucleated and is a good nucleating agent. On the other hand, maleic anhydride grafted polypropylene is not nucleated and is not a good nucleating agent.

The above data clearly demonstrates that since nucleation does not occur with maleic anhydride grafts of the art, it is totally unexpected that nucleation would occur utilizing an acrylic acid graft as claimed in the instant application.

We claim:

1. In an injection molding operation to produce thick shaped articles the method of improving the crystallization properties of crystallite forming $C_2$ to $C_8$ polyolefins which comprises:

a. incorporating into said crystallite forming polyolefins from 0.1 to 15 weight percent of a nucleating agent consisting essentially of a grafted $C_2$ to $C_8$ polyolefin wherein said graft component comprises 0.1 to 15 weight percent of an acrylic acid.

b. melting said crystallite forming polyolefin, and c. cooling the resulting blend to the temperature of crystallization of said blend and thus forming very small spherulites because of the presence of said nucleating agent.

2. A method according to claim 1 wherein said polyolefin is crystalline polypropylene.

3. A method according to claim 1 wherein said nongrafted polyolefin is crystalline polypropylene and said grafted polyolefin is crystalline polypropylene.

4. A method according to claim 3 wherein said grafted acrylic acid is present in about 2 to 8 weight percent in said grafted polymer.

5. A method according to claim 4 wherein the total amount of grafted acrylic acid component in said polymer blend after addition of said grafted nucleating agent is from about 0.06 to 1 weight percent.

6. An injection molded thick shaped article polymeric composition of matter comprising:

a. a major portion of crystalline $C_2$ to $C_8$ polyolefin;

b. a minor portion sufficient to improve the nucleation properties of said polyolefin of a nucleating agent consisting of a grafted $C_2$ to $C_8$ polyolefin containing from 0.1 to 20 weight percent of grafted acrylic acid.

7. A composition according to claim 6 wherein said crystalline polymer is polypropylene.

8. A composition according to claim 7 wherein the quantity of said acrylic acid in said composition is about 0.06 to 1 weight percent.

9. An injection molded thick shaped article polymeric composition of matter comprising:

a. a major proportion of crystalline polypropylene;

b. about 0.1 to 15 weight percent of an acrylic acid grafted $C_2$ to $C_8$ polyolefin containing from about 0.1 to 15 weight percent of said grafted acrylic acid.

10. A composition according to claim 9 wherein said polyolefin comprises crystalline polypropylene.

* * * * *